(12) United States Patent
Kang et al.

(10) Patent No.: US 12,358,452 B1
(45) Date of Patent: Jul. 15, 2025

(54) AIRBAG FASTENING STRUCTURE

(71) Applicant: HYUNDAI MOBIS CO., LTD., Seoul (KR)

(72) Inventors: Byung Gu Kang, Yongin-si (KR); You Sun Lee, Yongin-si (KR); Oh Koang Kwon, Yongin-si (KR); I Seul Kang, Yongin-si (KR); Tae Hyeong Kim, Cheongju-si (KR); Jae Min Yoo, Seoul (KR); Jung Geun Choi, Yongin-si (KR); Jeong Mo Heo, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/039,760

(22) Filed: Jan. 28, 2025

(30) Foreign Application Priority Data

Apr. 30, 2024 (KR) ........................ 10-2024-0057647

(51) Int. Cl.
  *B60R 21/203* (2006.01)
(52) U.S. Cl.
  CPC ............................... *B60R 21/2035* (2013.01)
(58) Field of Classification Search
  CPC .................. B60R 2022/287; B60R 22/4676
  See application file for complete search history.

(56) References Cited

U.S. PATENT DOCUMENTS

| 5,378,013 | A | * | 1/1995 | Warner | B60R 21/2035 |
| | | | | | 24/130 |
| 2016/0114752 | A1 | * | 4/2016 | Banno | B60R 21/21656 |
| | | | | | 280/728.2 |
| 2020/0139915 | A1 | * | 5/2020 | Funk | B60R 21/2037 |

FOREIGN PATENT DOCUMENTS

| CN | 1972823 | A | * | 5/2007 | ............ B60Q 5/003 |
| CN | 104859577 | A | * | 8/2015 | |
| DE | 202006003235 | U1 | * | 7/2006 | ......... B60R 21/2035 |
| DE | 102007006571 | A1 | * | 9/2007 | ......... B60R 21/2035 |
| DE | 102011000051 | A1 | * | 7/2011 | ........... B60R 21/203 |
| DE | 202014002194 | U1 | * | 7/2015 | ............ B60Q 5/003 |
| DE | 102017101227 | B3 | * | 3/2018 | |
| KR | 20230083089 | A | * | 6/2023 | |
| WO | WO-2013027493 | A1 | * | 2/2013 | ............ B60Q 5/003 |
| WO | WO-2022167632 | A1 | * | 8/2022 | ........... B60R 21/203 |

* cited by examiner

*Primary Examiner* — Nicole T Verley
(74) *Attorney, Agent, or Firm* — NSIP Law

(57) ABSTRACT

An airbag fastening structure and an airbag fastening system for a vehicle are provided. The airbag fastening structure includes a first assembly part provided in an airbag module, a second assembly part provided in a steering wheel and fastened to the first assembly part by a snap-fit fastening structure, a protective rib provided in an inclined pressing area where the first assembly part and the second assembly part are pressed for the snap-fit fastening, and a pad to absorb a fastening shock of the first assembly part and the second assembly part. The pad is provided in an inclined pressing area that does not overlap with the protective rib and in an engaging area where the first assembly part and the second assembly part are engaged with and supported by each other by the snap-fit fastening.

12 Claims, 9 Drawing Sheets

AIRBAG FASTENING STRUCTURE

CROSS-REFERENCE TO RELATED APPLICATION(S)

This application claims the benefit under 35 U.S.C. § 119 of Korean Patent Application No. 10-2024-0057647 filed on Apr. 30, 2024, in the Korean Intellectual Property Office, the entire disclosure of which is hereby incorporated by reference in its entirety for all purposes.

BACKGROUND

1. Field

The present disclosure relates to an airbag fastening structure that prevents damage from occurring in areas where components come into contact with and rub against each other during a snap-fit fastening process of an airbag module to a steering wheel.

2. Description of the Related Art

A driver's airbag is assembled into a steering wheel.

The airbag module of the driver's airbag includes an airbag cushion and an inflator accommodated in an airbag housing, and an airbag cover is assembled over the airbag housing.

Therefore, in the event of a vehicle accident, when the inflator detects a signal from a sensor, an igniter instantly explodes and combusts a gas-generating agent to generate gas.

As the gas generated in this way is supplied into the airbag cushion, the airbag cushion expands appropriately to cushion the impact on the passenger, reducing or preventing injury, thereby ensuring the safety of the passenger.

Meanwhile, the driver's airbag is provided with a hook on the airbag module, and an armature is provided in the center of the steering wheel. As the hook is snap-fit-fastened to the armature, the airbag module is assembled to the steering wheel.

However, during the process of fastening the hook to the armature, damage may occur in the areas where the components rub against each other. In addition, as the hook is brought into close contact with the armature, vibration and noise may occur during driving as the hook and the armature collide during driving.

The foregoing described as the background art is intended merely to aid in the understanding of the background of the present disclosure, and is not intended to mean that the present disclosure falls within the purview of the related art already known to those skilled in the art.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present disclosure provides an airbag fastening structure that prevents damage from occurring in the areas where components come into contact with and rub against each other during a snap-fit fastening process of an airbag module to a steering wheel.

In a general aspect of the disclosure, an airbag fastening structure includes: a first assembly part provided in an airbag module; a second assembly part provided in a steering wheel and fastened to the first assembly part by a snap-fit fastening structure; a protective rib provided in an inclined pressing area where the first assembly part and the second assembly part are pressed for the snap-fit fastening; and a pad configured to absorb a fastening shock of the first assembly part and the second assembly part, wherein the pad is provided in an inclined pressing area that does not overlap with the protective rib and in an engaging area where the first assembly part and the second assembly part are engaged with and supported by each other by the snap-fit fastening.

The protective rib and the pad may be provided in the first assembly part or the second assembly part.

An end portion of the first assembly part may be formed in a hook shape with an inclined surface, such that an inclined surface on an outer surface of the hook becomes the inclined pressing area, and the protective rib protrudes along the inclined surface.

The protective rib may be formed on each of left and right sides of the inclined surface.

The protective rib may be formed in a middle of the inclined surface.

An end portion of the first assembly part may have a hook shape with an inclined surface, such that an engaging surface connected to an inclined surface on an outer surface of the hook includes an engaging area, wherein the pad may be provided on the engaging surface.

The pad may extend from the engaging surface to a middle of the inclined surface.

A protruding thickness of the protective rib may be greater than a thickness of the pad.

An end portion of the second assembly part may have a hook shape with an inclined surface, such that an inclined surface on an outer surface of the hook includes the inclined pressing area, wherein the protective rib may be pressed and rubbed against the inclined surface of the second assembly part.

A width of the second assembly part in the right-left direction may be greater than a width of the first assembly part in a right-left direction.

In another general aspect of the disclosure, an airbag fastening system for a vehicle, includes: a first assembly part provided in an airbag module; a second assembly part provided in a steering wheel of the vehicle; a protective rib included in one of the first assembly part or the second assembly part; and a pad included in the other of the first assembly part or the second assembly part, wherein the protective rib is provided in an inclined pressing area where the first assembly part and the second assembly part are pressed together to form a snap-fit fastening structure, and wherein the pad is configured to absorb a fastening shock of the first assembly part and the second assembly part being assembled.

The pad may be provided in the inclined pressing area that does not overlap with the protective rib, and an engaging area where the first assembly part and the second assembly part are engaged with and supported by each other by being snap-fit fastened.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
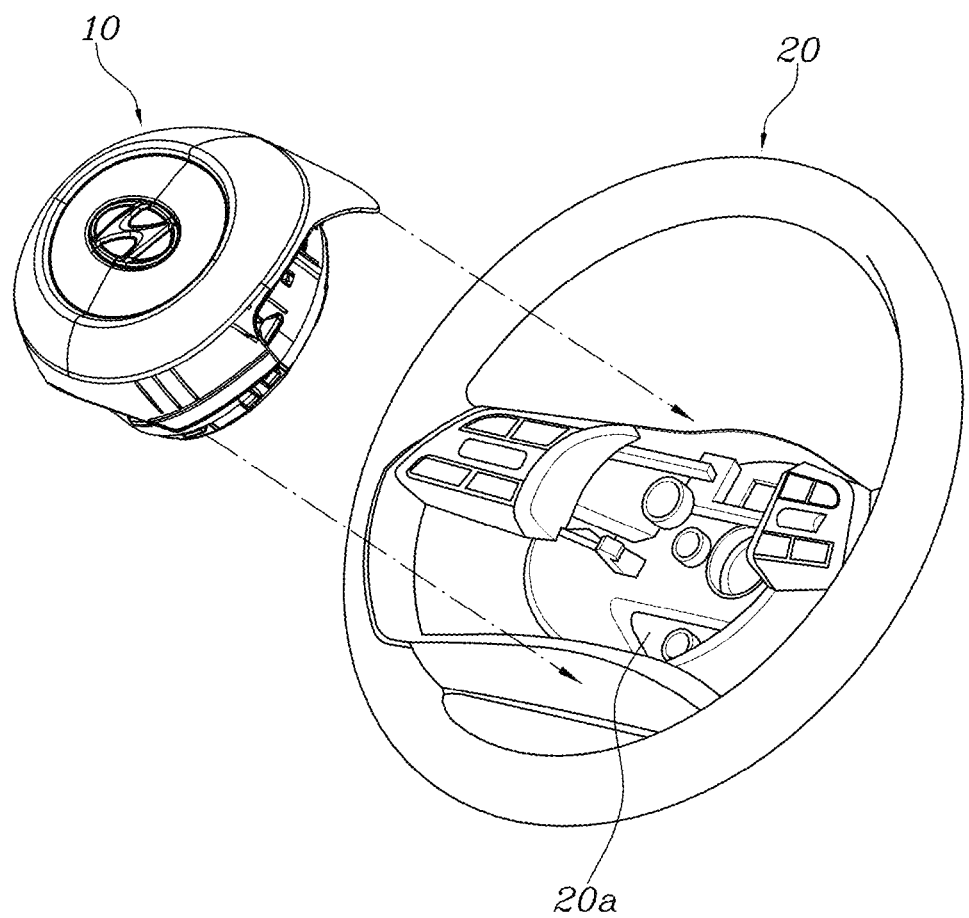
FIG. 1 is a view illustrating a state in which an airbag module according to an exemplary embodiment of the present disclosure is separated from a steering wheel.

Hereinafter, embodiments set forth herein will be described in detail with reference to the accompanying drawings, and the same or similar elements are given the same and similar reference numerals regardless of figure numbers, so duplicate descriptions thereof will be omitted.

The terms "module" and "unit" used for the elements in the following description are given or interchangeably used in consideration of only the ease of writing the specification, and do not have distinct meanings or roles by themselves.

In describing the embodiments set forth herein, a detailed description of known functions or configurations incorporated herein will be omitted when it is determined that the description may make the subject matter of the embodiments set forth herein unclear. In addition, it should be appreciated that the accompanying drawings are provided only for the sake of easy understanding of the embodiments set forth herein, and the technical idea of the present disclosure is not limited to the accompanying drawings and includes all modifications, equivalents, or alternatives falling within the spirit and scope of the present disclosure.

Terms including an ordinal number such as "a first" and "a second" may be used to describe various elements, but the elements are not limited to the terms. The above terms are used merely for the purpose of distinguishing one element from other elements.

In the case where an element is referred to as being "connected" or "coupled" to any other elements, it should be understood that not only the element may be directly connected or coupled to the other elements, but also another element may exist therebetween. Contrarily, in the case where an element is referred to as being "directly connected" or "directly coupled" to any other element, it should be understood that no other element exists therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Hereinafter, exemplary embodiments of the present disclosure will be described in detail with reference to the accompanying drawings.

An airbag fastening structure according to the present disclosure includes: a first assembly part 100 provided in an airbag module 10; a second assembly part 200 provided in a steering wheel 20 and fastened to the first assembly part 100 by a snap-fit fastening structure; a protective rib 130 provided in an inclined pressing area where the first assembly part 100 and the second assembly part 200 are pressed for the snap-fit fastening; and a pad 140 configured to absorb a fastening shock of the first assembly part 100 and the second assembly part 200, the pad being provided in an inclined pressing area that does not overlap with the protective rib 130 as well as in an engaging area where the first assembly part 100 and the second assembly part 200 are engaged with and supported by each other by the snap-fit fastening.

Figure 2:
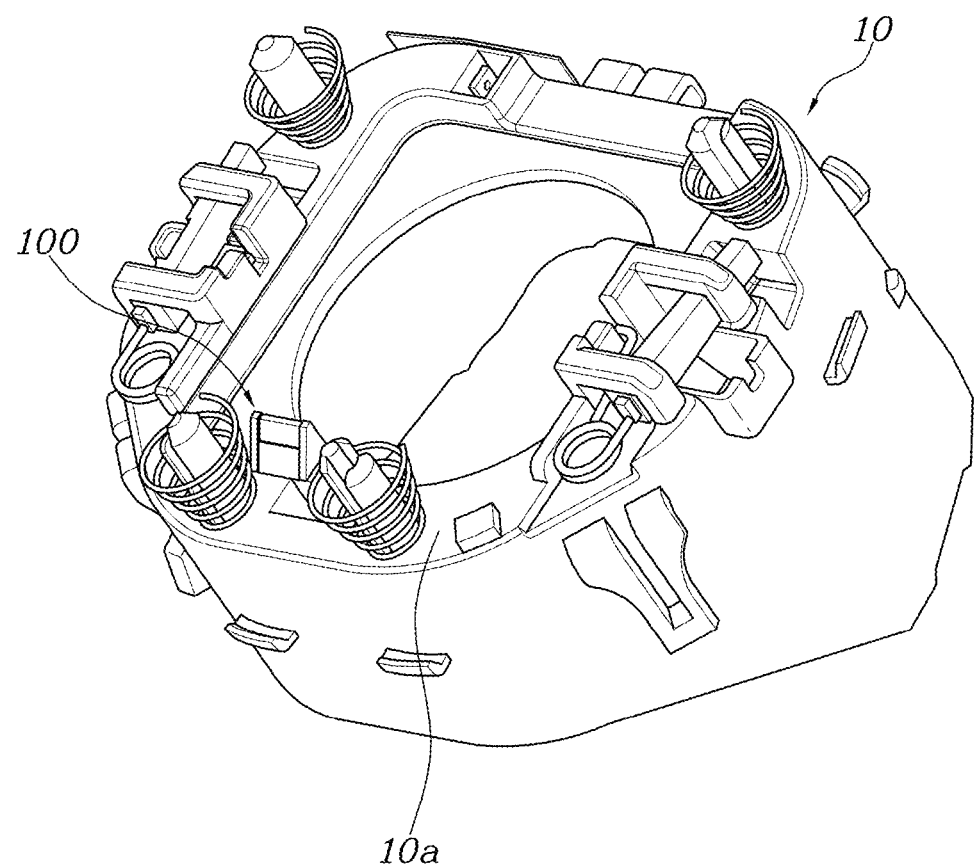
FIG. 2 is a view illustrating the shape of the bottom side of the airbag module according to an exemplary embodiment of the present disclosure.

Referring to FIGS. 1 and 2, the first assembly part 100, which is formed of a plastic material, is provided to protrude under the bottom surface (6 o'clock direction) of a mounting plate 10a that forms the lower portion of the airbag module 10.

In addition, a metal armature 20a is formed in a plate shape in the central portion of the steering wheel 20, a steering shaft is assembled in the center of the armature 20a, and a spoke of the steering wheel 20 is fixed between the armature 20a and the rim.

In addition, under the top surface of the armature 20a (6 o'clock direction), the second assembly 200 is provided at a position corresponding to the first assembly part 100, so that the first assembly part 100 and the second assembly part 200 are fastened by a snap-fit fastening structure. Here, the second assembly part 200 may be provided separately from the armature 20a, but may be formed integrally with the armature 20a.

That is, the lower end portion of the first assembly part 100 is formed in a hook shape, an inclined surface 110 with an inclined pressing area is formed on the hook of the first assembly part 100, and an engaging surface 120 having an engaging area is formed on at the portion connected to the inclined surface 110.

At this time, the upper end portion of the second assembly part 200 is also formed in a hook shape, and an inclined surface 210 with an inclined pressing area may also be formed on the hook of the second assembly part 200. In addition, an engaging surface 220 having an engaging area is formed at a portion connected to the inclined surface 210 of the second assembly part 200.

Accordingly, when the first assembly part 100 provided on the steering wheel 20 is pressed toward the second assembly part 200 provided on the airbag module 10, the inclined surface 110 of the first assembly part 100 and the inclined surface 210 of the second assembly part 200 are pressed against each other, causing the first assembly part 100 to elastically deform. As the first assembly part 100 elastically restores when the inclined surface 110 of the first assembly part 100 breaks away from the inclined surface 210 of the second assembly part 200, the first assembly part 100 is snap-fit-fastened to the second assembly part 200, so that the engaging surface 120 of the first assembly part 100 and the engaging surface 220 of the second assembly part 200 are engaged with and supported against each other.

In particular, in the present disclosure, during the snap-fit fastening process of the first assembly part 100 and the second assembly part 200, the inclined surface 110 of the first assembly part 100 and the inclined surface 210 of the second assembly part 200 are pressed with the protective rib 130 interposed therebetween.

In addition, the engaging surface 120 of the first assembly part 100 and the engaging surface 220 of the second assembly part 200 are engaged with and supported against each other with the pad 140 interposed therebetween, and the pad 140 is fixed to one of the inclined surfaces that does not overlap with the protective rib 130.

That is, in the section where the first assembly part 100 and the second assembly part 200 are pressed together, the two inclined surfaces do not directly rub against each other, and rather, friction occurs when one of the two inclined surfaces is pressed against the protective rib 130.

Therefore, since the protective ribs 130 rub against the inclined surface, the pad 140 does not rub against the inclined surface, thereby preventing the pad 140 from being torn and damaged due to friction with the inclined surface.

In the present disclosure, the protective rib 130 and the pad 140 may be provided on either the first assembly part 100 or the second assembly part 200.

For example, the protective rib 130 may be formed on the inclined surface 110 of the first assembly part 100 or the inclined surface 210 of the second assembly part 200.

In addition, the inclined surface 140 may be formed on the inclined surface 110 and the engaging surface 120 of the first assembly part 100, or on the inclined surface 210 and the engaging surface 220 of the second assembly part 200.

Figure 3:
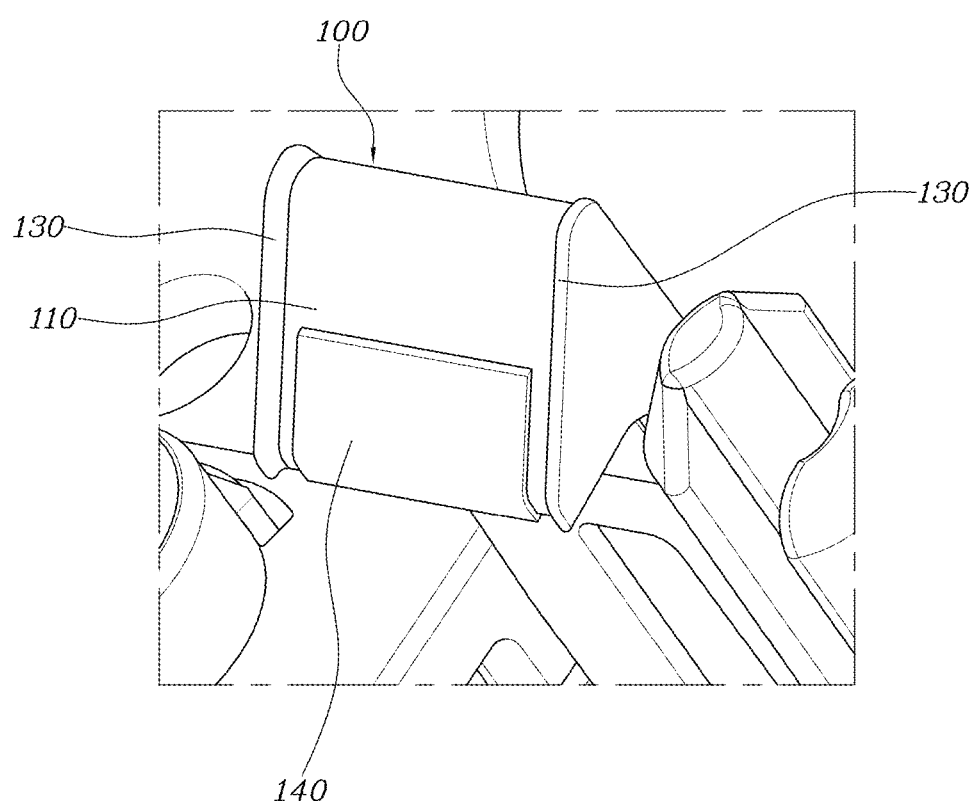
FIG. 3 is an enlarged view illustrating the shapes of protective ribs and a pad according to an exemplary embodiment of the present disclosure.
Figure 7:
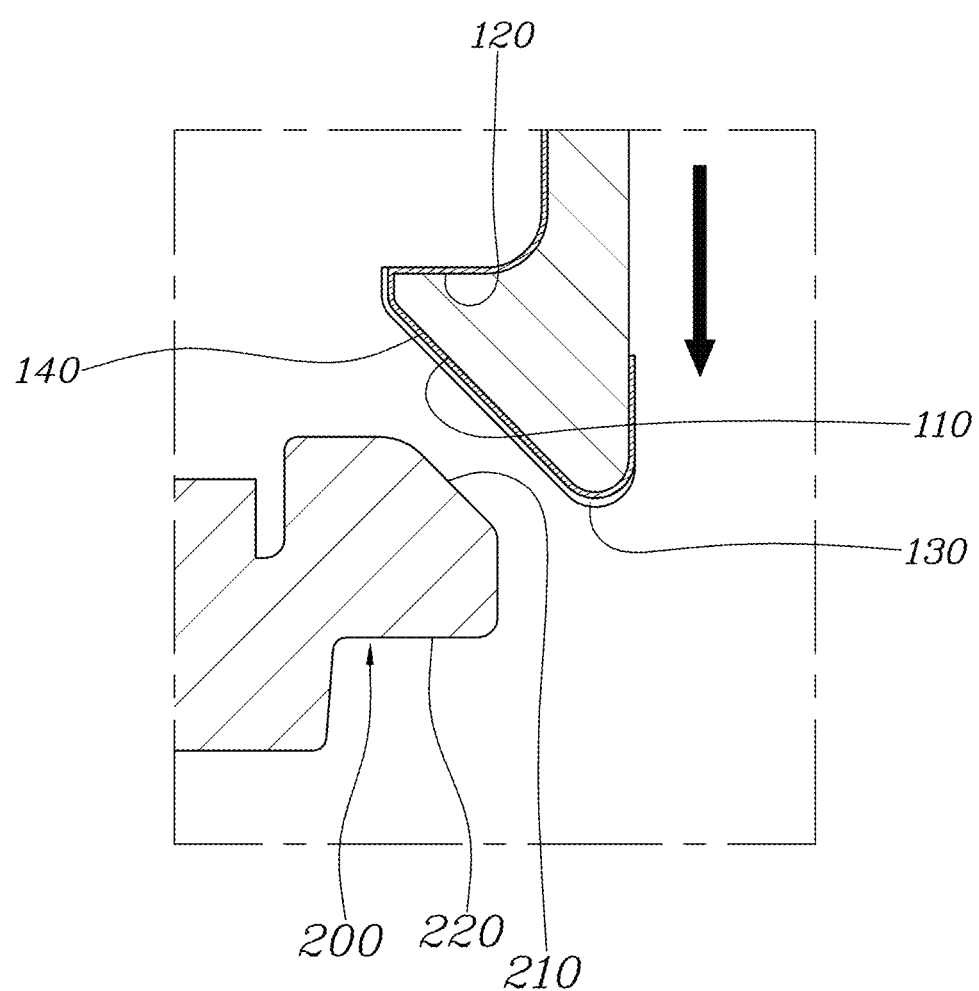

In addition, as illustrated in FIGS. 3 and 7, in the present disclosure, an end portion of the first assembly part 100 may be formed in a hook shape with the inclined surface 110, so that the inclined surface 110 on the outer surface of the hook becomes the inclined pressing area, and the protective rib 130 may protrude along the inclined surface 110.

That is, the inclined surface 110 is formed on the lower end of the first assembly part 100 facing the second assembly part 200, and the protective rib 130 protrudes along the inclined surface 110 of the first assembly part 100.

Accordingly, in the section where the first assembly part 100 is pressed against the second assembly part 200, the protective rib 130 formed on the first assembly part 100 is pressed while rubbing against the second assembly part 200, thereby preventing the second assembly part 200 from rubbing against the pad 140. Thus, the pad 140 is prevented from being damaged due to friction.

As a first embodiment of the structure of the protective rib 130, the protective rib 130 may be formed on each of the left and right sides of the inclined surface 110.

Figure 4:
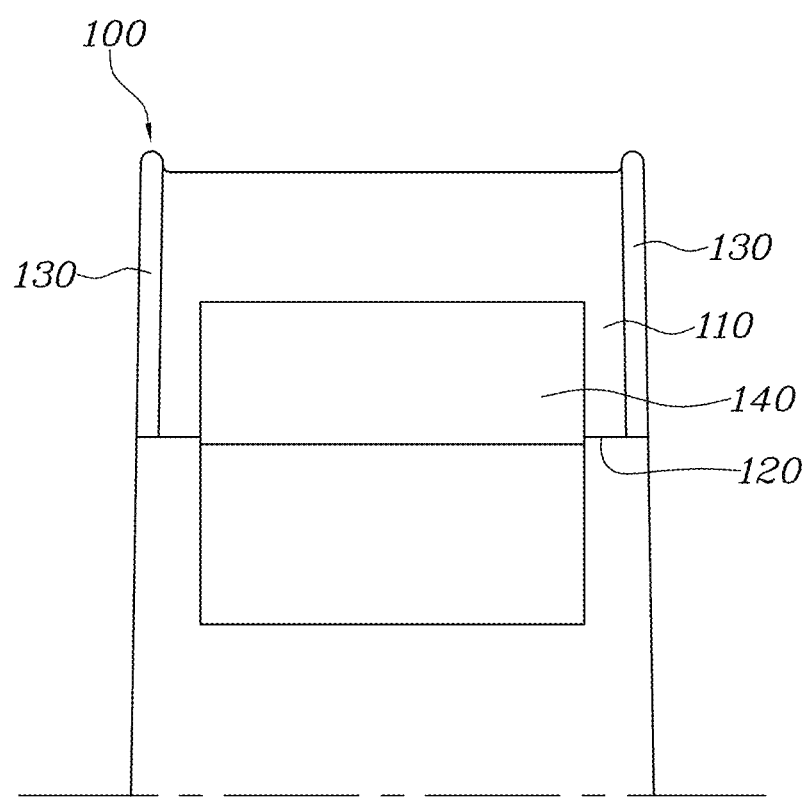
FIG. 4 is a view illustrating the structure of a first embodiment of the protective rib along with the difference in thickness between the protective rib and the pad according to an exemplary embodiment of the present disclosure.

That is, as illustrated in FIGS. 3 and 4, the protective rib 130 may be formed along the inclined surface 110 in the vertical length direction on each of the left and right sides of the inclined surface 110 of the first assembly part 100.

As a second embodiment of the structure of the protective rib 130, the protective rib 130 may be formed in the middle of the inclined surface 110.

Figure 5:
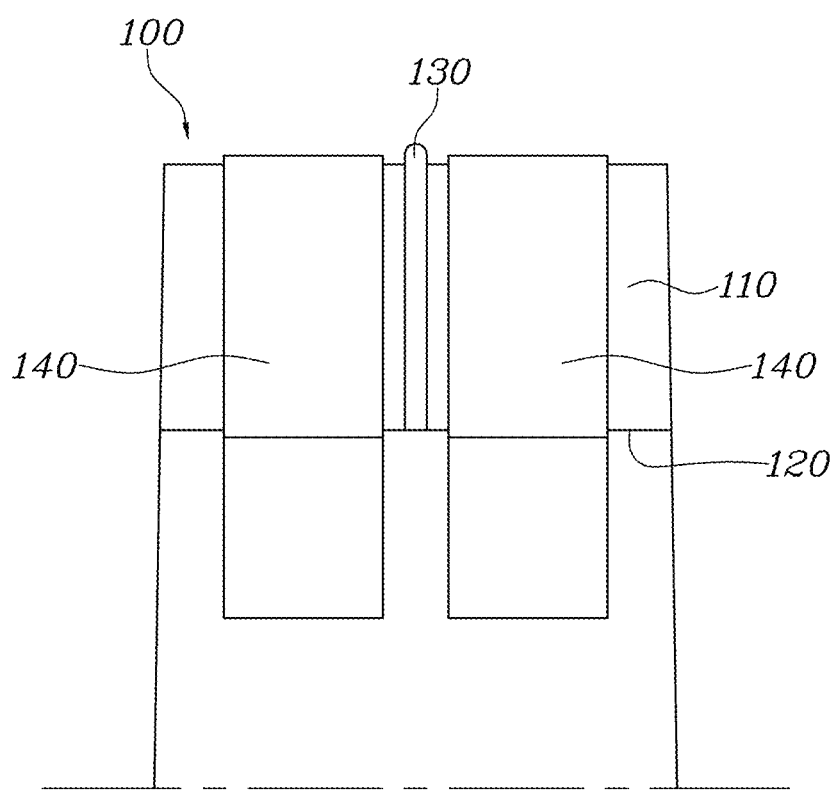
FIG. 5 is a view illustrating the structure of a second embodiment of the protective rib according to an exemplary embodiment of the present disclosure.
Figure 6:
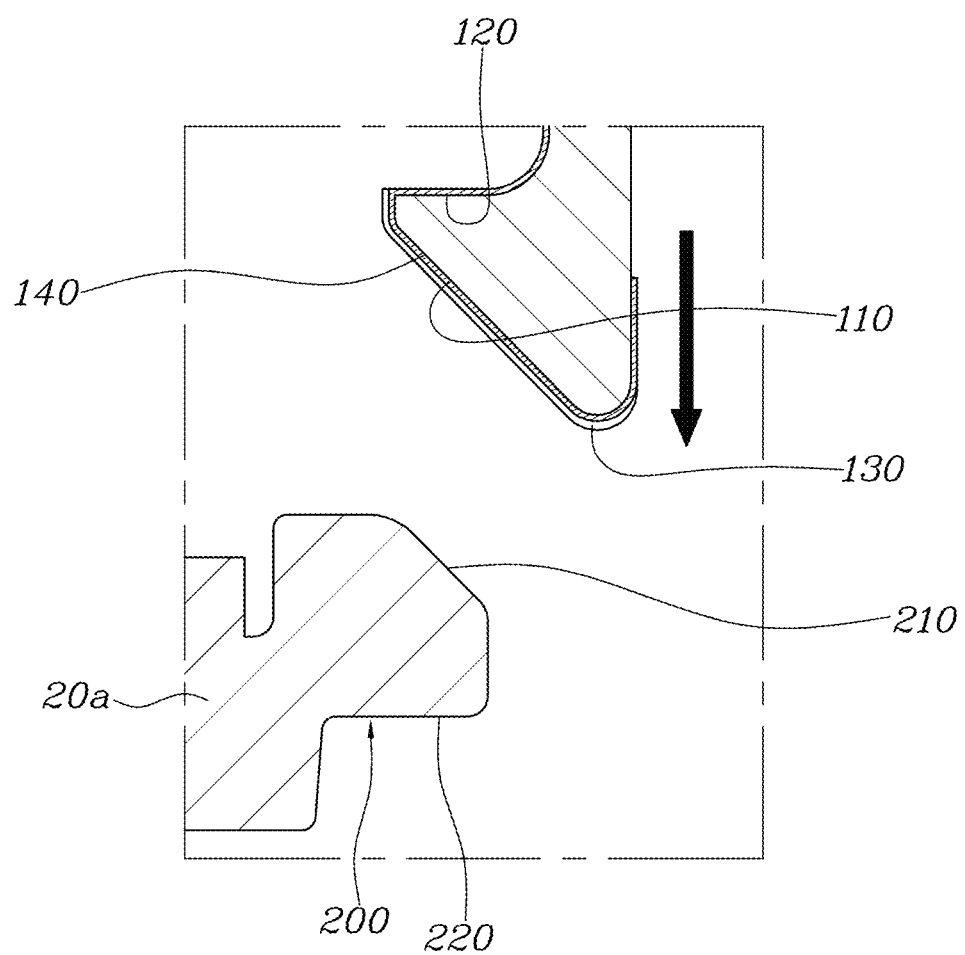
FIGS. 6 to 9 are views illustrating an operation in which a first assembly part according to an exemplary embodiment of the present disclosure is snap-fit-fastened to a second assembly part.

That is, as illustrated in FIG. 5, the protective rib 130 may be formed along the vertical length direction of the inclined surface 110 at the center of the inclined surface 110 of the first assembly part 100.

In addition, according to the present disclosure, the end portion of the first assembly part 100 may be formed in a hook shape with the inclined surface 110, the engaging surface 120 connected to the inclined surface 110 on the outer surface of the hook may become the engaging area, and the pad 140 may be provided on the engaging surface 120.

That is, the engaging surface 120 of the first assembly part 100 is formed horizontally at the upper end of the inclined surface 110 formed on the first assembly part 100, and the engaging surface 220 of the second assembly part 200 is formed horizontally at the lower end of the inclined surface 210 formed on the second assembly part 200.

Figure 8:
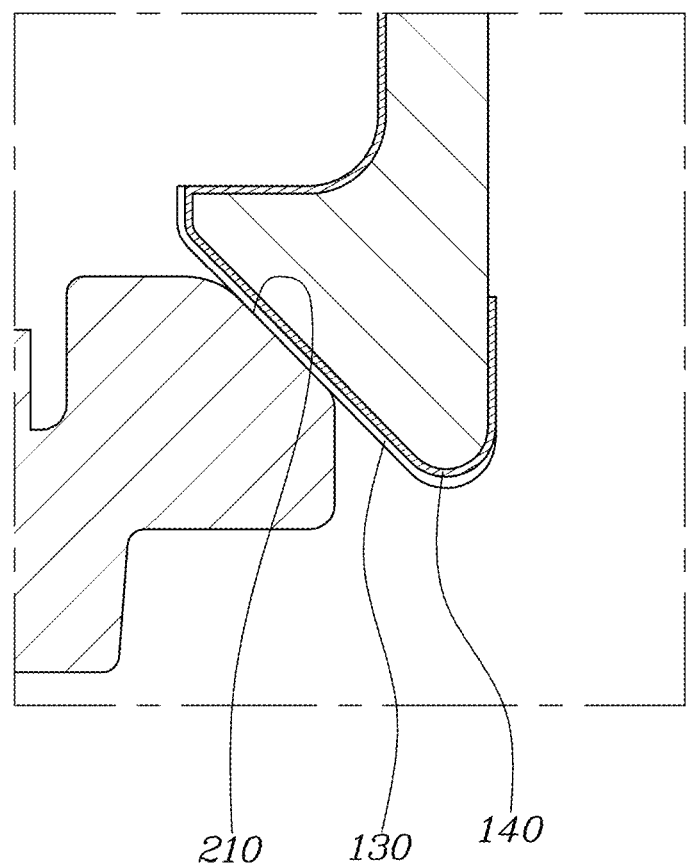
Figure 9:
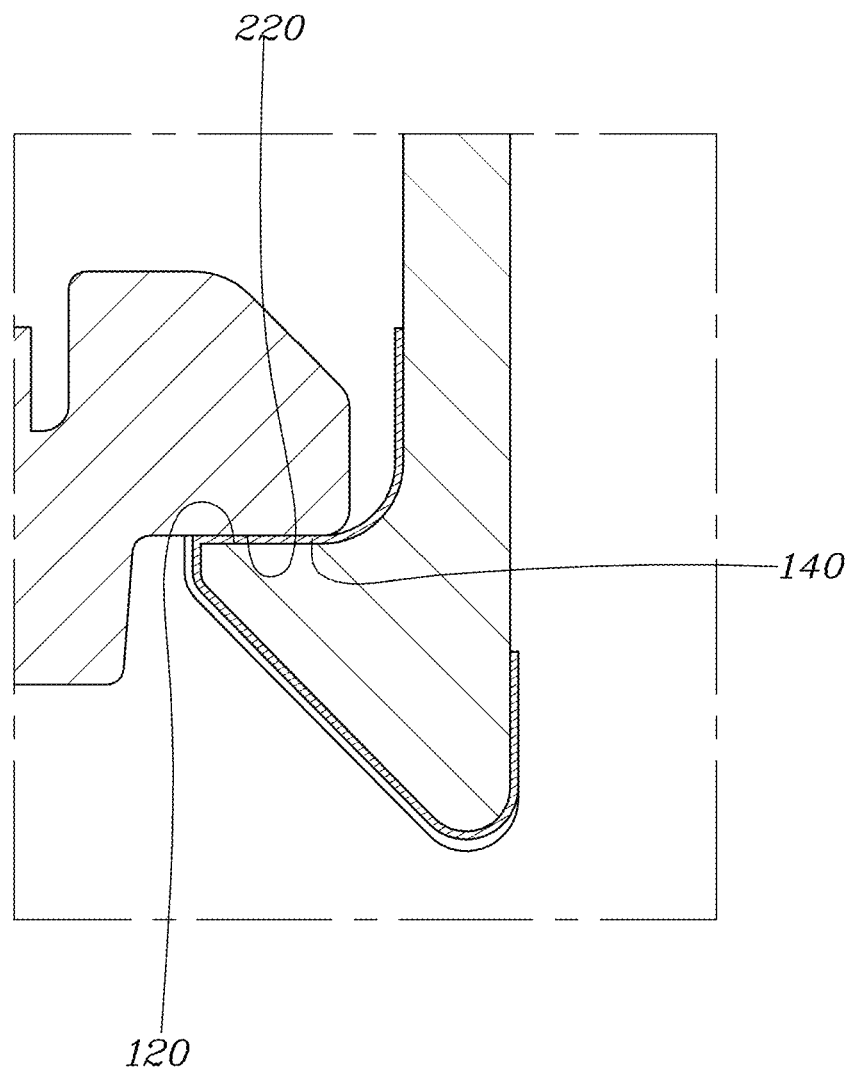

Accordingly, as illustrated in FIGS. 7 to 9, the inclined surface 110 of the first assembly part 100 and the inclined surface 210 of the second assembly part 200 are pressed and rubbed against each other as the first assembly part 100 moves downward, causing the first assembly part 100 to elastically deform.

During this process, when the engaging surface 120 of the first assembly part 100 is positioned below the engaging surface 220 of the second assembly part 200, the first assembly part 100 is snap-fit-fastened to the second assembly part 200 by the elastic restoring force of the first assembly part 100, thereby allowing the pad 140, which is fixed to the engaging surface 120 of the first assembly part 100, to be supported on the bottom surface of the engaging surface 220 of the second assembly part 200. As a result, the pad 140 reduces the fastening impact and noise of the first assembly part 100 and the second assembly part 200.

In addition, in the present disclosure, the pad 140 may extend from the engaging surface 120 to the middle of the inclined surface 110.

That is, as illustrated in FIGS. 3 and 4, the pad 140 is not only fixed along the inclined surface 110 of the first assembly part 100 but also fixedly extends from the inclined surface 110 to the middle of the engaging surface 120.

Therefore, snap-fit fastening may be achieved without causing the pad 140 to be peeled off or detached in the snap-fit-fastening direction of the second assembly part 200 when the engaging surface 120 of the first assembly part 100 is positioned below and snap-fit-fastened to the engaging surface 220 of the second assembly part 200.

In addition, since the protective rib 130 is formed on the inclined surface 110, the pad 140 does not need to be fixed to the inclined surface 110 and the rear surface of the hook, but only needs to be fixed up to the middle of the inclined surface 110, thereby reducing the length of the pad 140 and lowering the cost.

Furthermore, in the present disclosure, the protruding thickness of the protective rib 130 may be greater than the thickness of the pad 140.

That is, as illustrated in FIG. 5, since the thickness of the protective rib 130 is greater than that of the pad 140, when the first assembly part 100 is assembled with the second assembly part 200, the inclined surface 210 of the second assembly part 200 may come into contact with the protective rib 130 to be capable of preventing the inclined surface 210 from coming into contact with the pad 140, thereby reliably preventing damage to the pad 140.

For reference, while it is preferable for the pad 140 to fixedly extend from the engaging surface 120 to the middle of the inclined surface 110, as illustrated in FIGS. 5 to 9, the pad 140 may also have a structure that extends to the rear surface of the inclined surface 110 while covering the entire inclined surface 110.

Meanwhile, in the present disclosure, the end portion of the second assembly part 200 may be formed in the hook shape with the inclined surface 210, so that the inclined surface 210 on the outer surface of the hook becomes the inclined pressing area, allowing the protective rib 130 to be pressed and rubbed against the inclined surface 210 of the second assembly part 200.

That is, the inclined surface 210 may be formed on the hook of the second assembly part 200, and the inclined surface 210 may have an incline angle corresponding to the inclined surface 110 of the first assembly part 100.

Therefore, the pressing and friction between the first assembly part 100 and the second assembly part 200 may be achieved more stably, improving the assemblability of the airbag module 10.

In addition, in the present disclosure, the width of the second assembly part 200 in the left-right direction may be greater than the width of the first assembly part 100 in the left-right direction.

That is, since the protective rib 130 is formed on the inclined surface 110 of the first assembly part 100, if the width of the first assembly part 100 in the left-right direction is smaller than the width of the second assembly part 200 in the left-right direction, the protective rib 130 may break away from the inclined surface 210 of the second assembly part 200 in the section where the first assembly part 100 and the second assembly part are pressed and rubbed against each other.

Thus, since the width of the second assembly part 200 in the left-right direction is greater than the width of the first assembly part 100 in the left-right direction, the protective rib 130 can be in stable contact with the inclined surface 210 of the second assembly part 200 in the section where the first assembly part 100 and the second assembly part are pressed and rubbed against each other.

As described above, in the present disclosure, since the protective rib 130 is formed on the inclined surface 110 of the first assembly part 100, which is snap-fit-fastened during the process of snap-fit-fastening the airbag module 10 to the steering wheel 20, the inclined surface 210 of the second assembly part 200 is prevented from coming into contact with the pad 140, thereby preventing the pad 140 from being torn and damaged.

While the present disclosure has been described in detail only with reference to exemplary embodiments thereof, it is evident to those ordinarily skilled in the art that various changes and modifications can be made within the scope of the technical idea of the present disclosure, and it is natural that such modifications and changes belong to the scope of the accompanying claims.

Although only particular embodiments of the present disclosure have been described above in detail, it will be apparent to those skilled in the art that various changes and modifications may be made within the scope of the technical idea of the present disclosure and, as a matter of course, these changes and modifications fall within the scope of the appended claims.

What is claimed is:

1. An airbag fastening structure, comprising:
a first assembly part provided in an airbag module;
a second assembly part provided in a steering wheel and fastened to the first assembly part by a snap-fit fastening structure;
a protective rib provided in an inclined pressing area where the first assembly part and the second assembly part are pressed for the snap-fit fastening; and
a pad configured to absorb a fastening shock of the first assembly part and the second assembly part,
wherein the pad is provided in an inclined pressing area that does not overlap with the protective rib and in an engaging area where the first assembly part and the second assembly part are engaged with and supported by each other by the snap-fit fastening.

2. The airbag fastening structure of claim 1, wherein the protective rib and the pad are provided in the first assembly part or the second assembly part.

3. The airbag fastening structure of claim 1, wherein an end portion of the first assembly part is formed in a hook shape with an inclined surface, such that an inclined surface on an outer surface of the hook becomes the inclined pressing area, and the protective rib protrudes along the inclined surface.

4. The airbag fastening structure of claim 3, wherein the protective rib is formed on each of left and right sides of the inclined surface.

5. The airbag fastening structure of claim 3, wherein the protective rib is formed in a middle of the inclined surface.

6. The airbag fastening structure of claim 1, wherein an end portion of the first assembly part has a hook shape with an inclined surface, such that an engaging surface connected to an inclined surface on an outer surface of the hook comprises an engaging area, and
wherein the pad is provided on the engaging surface.

7. The airbag fastening structure of claim 6, wherein the pad extends from the engaging surface to a middle of the inclined surface.

8. The airbag fastening structure of claim 3, wherein a protruding thickness of the protective rib is greater than a thickness of the pad.

9. The airbag fastening structure of claim 3, wherein an end portion of the second assembly part has a hook shape with an inclined surface, such that an inclined surface on an outer surface of the hook comprises the inclined pressing area, and
wherein the protective rib is pressed and rubbed against the inclined surface of the second assembly part.

10. The airbag fastening structure of claim 3, wherein a width of the second assembly part in the right-left direction is greater than a width of the first assembly part in a right-left direction.

11. An airbag fastening system for a vehicle, the system comprising:
a first assembly part provided in an airbag module;
a second assembly part provided in a steering wheel of the vehicle;
a protective rib included in one of the first assembly part or the second assembly part; and
a pad included in the other of the first assembly part or the second assembly part,
wherein the protective rib is provided in an inclined pressing area where the first assembly part and the second assembly part are pressed together to form a snap-fit fastening structure, and
wherein the pad is configured to absorb a fastening shock of the first assembly part and the second assembly part being assembled.

12. The system of claim 11, wherein the pad is provided in the inclined pressing area that does not overlap with the protective rib, and an engaging area where the first assembly part and the second assembly part are engaged with and supported by each other by being snap-fit fastened.

* * * * *